United States Patent
Schuster

[19]

[11] Patent Number: 6,068,109
[45] Date of Patent: May 30, 2000

[54] SORTING ARRANGEMENT, IN PARTICULAR FOR ITEMS OF POST

[75] Inventor: Rudolf Schuster, Kirchheim, Germany

[73] Assignee: Siemens Aktiengesellschaft, Munich, Germany

[21] Appl. No.: 09/068,045

[22] PCT Filed: Oct. 24, 1996

[86] PCT No.: PCT/DE96/02037

§ 371 Date: Apr. 30, 1998

§ 102(e) Date: Apr. 30, 1998

[87] PCT Pub. No.: WO97/16363

PCT Pub. Date: May 9, 1997

[30] Foreign Application Priority Data

Oct. 30, 1995 [DE] Germany .............. 195 40 836

[51] Int. Cl.⁷ ................................................. B65G 17/36
[52] U.S. Cl. ................................... 198/704; 198/711
[58] Field of Search .................... 198/703, 704, 198/710, 711, 712

[56] References Cited

U.S. PATENT DOCUMENTS 3,300,026  1/1967  Lens .......................... 198/704
4,506,781  3/1985  Briggs ........................ 198/711

FOREIGN PATENT DOCUMENTS 2 596 299   3/1986  France .
WO 92/21596  5/1992  WIPO .
WO 95/02467  7/1994  WIPO .

*Primary Examiner*—James R. Bidwell
*Attorney, Agent, or Firm*—Hill & Simpson

[57] ABSTRACT

A sorting apparatus is disclosed which includes a plurality of carriers which circulate from an upper section of a conveying device to a lower section of the conveying device. The carriers are secured to circulating carriages that are driven by an endless cable that circulates in the two planes, or between the upper and lower sections of the conveying device. The upper and lower sections are connected by a vertically running deflection device which includes one wheel that connects a rear side of the upper section of the conveying device to a front side of the lower section of the conveying device as the cable proceeds from the upper section to the lower section. The vertically running deflection device also includes a second wheel which connects a rear side of the lower section of the conveying device to a front side of the upper section of the conveying device as the cable returns from the lower section to the upper section of the conveying device. The wheels rotate on roller systems and further include rubber inserts for smooth and quiet operation. As the cable and conveying carriages are circulated between the upper and lower sections, the cable and conveying carriages are extended around one of the wheels and pass through the same wheel on the return trip.

19 Claims, 7 Drawing Sheets

SORTING ARRANGEMENT, IN PARTICULAR FOR ITEMS OF POST

BACKGROUND OF THE INVENTION

FIELD OF THE INVENTION

The present invention relates generally to sorting apparatuses and, more specifically, to sorting apparatuses for sorting mail and other articles. Still more specifically, the present invention relates to a dual-level sorting apparatus which includes a conveying device having an upper section and a lower section, the upper and lower sections being connected so that mailpieces or articles can be circulated from the upper section to the lower section for sorting.

The machine-readable postcodes which should be specified on items of mail, such as letters, postcards, packets and the like, as an identification for a location, a postal district, a PO box or a major recipient, permit rapid, mechanical distribution of mail. In this arrangement, sorting of the incoming items of mail takes place with the aid of controllable conveyable-article carriers which are each loaded, manually or mechanically, with an item of mail in special input locations and then discharge said item of mail to a sorting container, or a corresponding sorting compartment, assigned to the respective postcode. Since, for space-saving reasons, it is desired for both the input locations and the sorting containers or sorting compartments to be arranged in various planes, the conveyable-item carriers circulating on conveying devices must, if appropriate, also be capable of spanning various levels. After transfer of the item of mail to the assigned sorting container or the assigned sorting compartment, the empty conveyable-article carrier can once again be loaded with an item of mail when it passes an input location.

U.S. Pat. No. 3,300,026 discloses a sorting apparatus for mail which has pairs of conveyable-article carriers which circulate on a conveying device and are intended for receiving, for transporting and for discharging mail, in a controllable manner. The conveying device comprises two chains which circulate endlessly at a distance from one another and that are guided in a meandering fashion over corresponding rollers and, on a plurality of planes located one above the other. The chains guide the conveyable-article carriers past in each case one row with sorting containers. The meandering progression of the conveying device in a plurality of planes results in a relatively large overall height of the sorting apparatus, with correspondingly poor accessibility to the sorting containers arranged in the top planes.

WO 95/02468 discloses a sorting apparatus, in particular for mail, which has a plurality of conveyable-article carriers which circulate on a conveying device and are intended for receiving, for transporting and for discharging, in a controllable manor, the conveyable articles to assigned sorting containers. The conveyable-article carriers are fastened on circulating transporting carriages of the conveying device, it being the case that the transporting carriages, which are driven by an endlessly circulating transporting cable, are guided, by way of rollers, on two profiles which are aligned at a vertical distance from one another and extend in the transporting direction. The transporting carriages circulate, via a vertical deflection, in two planes, with the result that, in each plane, they can be guided along in each case two parallel rows with sorting containers.

In the case of the conveying device of the sorting apparatus disclosed by WO 95/02468, the conveyable-article carriers which are loaded with conveyable articles, for example, in a rear loading zone of the bottom plane, are deflected forwards on the same level and then transported past the sorting containers arranged in a row on the front side of the bottom plane. In the region of the vertical deflection, the conveyable-article carriers are then guided obliquely upwards into the top plane and, there, are transported past the sorting containers arranged in a row on the rear side. In the region of the end side, the sorting containers are then deflected forwards on the same level and then transported past the sorting containers arranged in a row on the front side. In the region of the vertical deflection, the conveyable-article carriers are then guided obliquely downwards into the bottom plane and, there, are transported past the sorting containers arranged in a row on the rear side. In the region of the vertical deflection, the two profiles for guiding the transporting carriages and the transporting cable run, in one case, obliquely from bottom to top and, in another case, obliquely from top and to bottom in the opposite direction. Guidance of the transporting cable over two appropriately sized cable wheels arranged in the region of the vertical deflection would result in a greater overall length of the sorting apparatus. Guidance of the transporting cable over a plurality of deflection rollers arranged in the region of the vertical deflection may avoid this increase in overall length. On the other hand, the service life of the transporting cable is influenced to a great extent by the flexing of the cable which takes place as the cable runs over the deflection rollers. Moreover, aggravating running noise is produced when the transporting cable in guided over a plurality of deflection rollers.

SUMMARY OF THE INVENTION

The present invention has solved the problem of improving, for the sorting apparatus which is known from WO 95/02468, the guidance of the transporting cable in the region of the vertical deflection, without increasing the overall length in the process, in such a way as to increase the service life of the transporting cable and to reduce the running noise.

Besides sorting and distributing mail in public post offices or central in-house mail departments of large companies, a sorting apparatus according to the invention may also be used for comparable tasks, for example, in storage systems or automated order-picking systems, in the case of which goods or parts provided with codings are fed to sorting containers, or sorting compartments, assigned to the respective codings.

The invention is based on the finding that the advantages in terms of service life and quiet running which can be achieved by guiding the transporting cable over a large cable wheel can be combined with the advantages in terms of low space requirements which can be achieved by guiding the transporting cable over a plurality of deflection rollers. For this purpose, the transporting cable is guided over a wheel rim which, with the omission of central mounting, has its inner circumference mounted rotatably on a plurality of supporting rollers.

In an embodiment, the present invention permits a further reduction in the overall length of the sorting apparatus. The interengagement of the wheel rims results in a reduction in the order of magnitude of the wheel-rim diameter In an embodiment, the present invention facilitates both the installation and the removal of the two inter-engaging wheel rims.

In an embodiment, the present invention provides for a considerable improvement in terms of the quiet running of the sorting apparatus, in which case, wheel-rim inserts made of rubber in particular have proven successful.

In an embodiment, the present invention provides a sorting apparatus comprising a conveying device including an upper section and a lower section. The upper section and lower section are connected by a transport carriage which is connected to and propelled by an endless cable. The transport carriage is also connected to a plurality of article carriers whereby the transport carriage, endless cable and article carriers are circulated from the upper section to the lower section of the conveying device. During the transition from the upper section to the lower section, the endless cable extends around a first wheel as the cable proceeds from the upper section to the lower section. On the return trip, or when the endless cable is returned from the lower section to the upper section, the cable extends around a second wheel. Each of the wheels has an inner circumference that is rotatably mounted onto a plurality of supporting rollers.

In an embodiment, the first wheel extends through the second wheel.

In an embodiment, one of the wheels is separable so that one of the two wheels can be removed from the other of the two wheels.

In an embodiment, the wheels further comprise nonmetallic inserts, such as rubber, for engaging the cable.

In an embodiment, the upper and lower sections are disposed parallel to one another. Each section includes a front side disposed between first and second opposing ends. Each section also includes a rear side disposed between first and second opposing ends. The front sides of the upper and lower sections are substantially coplanar as are the rear sides. The first wheel is disposed between the first ends of the upper and lower sections and extends from the rear side of the upper section to the front side of the lower section while the second wheel is also disposed between the first ends of the upper and lower sections and extends from the rear side of the lower section to the front side of the upper section.

In an embodiment, the path of the endless cable is as follows. Beginning from the second end of the upper section, the cable proceeds along the rear side of the upper section to the first end of the upper section, around the first wheel to the first end of the lower section at the front side of the lower section. The cable then proceeds along the front side of the lower section to the second end of the lower section, around at least one deflection roller, or other means to propel the cable, which is disposed at the second end of the lower section. The cable then proceeds to the rear side of the lower section from the second end of the lower section to the first end of the lower section. The cable then proceeds around the second wheel to the front side of the upper section at the first end of front section, along the front side of the upper section to the second end of the upper section and around at least one deflection roller, or other means for propelling the cable, back to the rear side of the upper section.

In an embodiment, the transport carriage comprises a plurality of rollers and the upper and lower sections of the conveying device each comprise a tubular member that engages the rollers of the transport carriage for smooth and quiet operation.

Other objects and advantages of the present invention will become apparent from reading the following detailed description and appended claims, and upon reference to the accompanying drawings.

BRIEF DESCRIPTION OF THE DRAWINGS

An exemplary embodiment of the invention is described in more detail hereinbelow and is illustrated in the drawing, in which.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
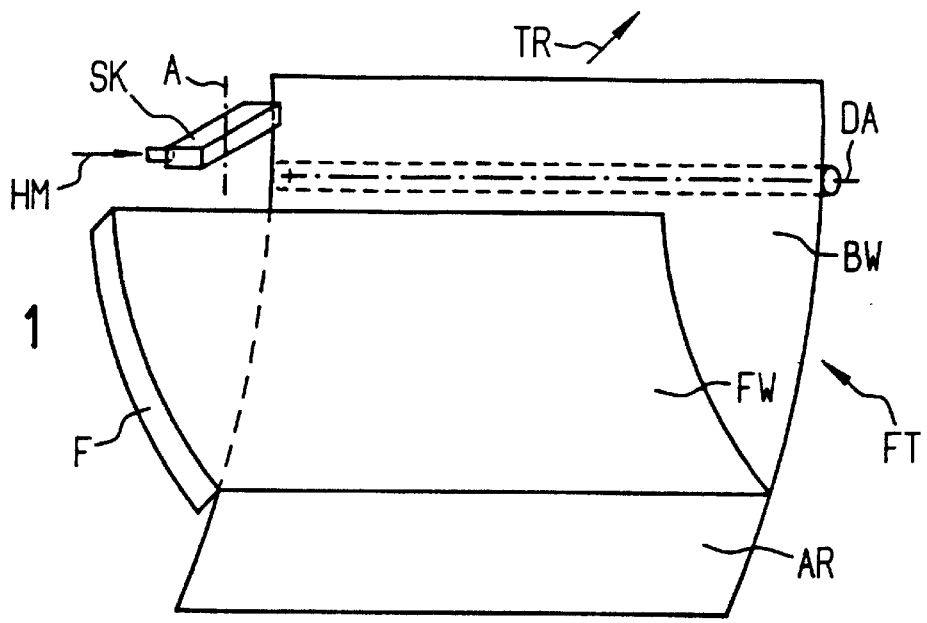
FIG. 1 is a perspective illustration of a conveyable-article carrier comprising a fixedly arranged wall part and a movably arranged wall part.

FIG. 1 is a perspective illustration of a conveyable-article carrier which is designated as a whole by FT and comprises a fixedly arranged wall part FW and a movable wall part BW. In this arrangement, the movable wall part BW can be pivoted about a pivot pin DA aligned transversely with respect to the transporting direction TR of the conveyable-article carrier FT.

FIG. 1 illustrates the closed position of the conveyable-article carrier FT, in which the fixedly arranged wall part FW and the movably arranged wall part BW, each of which are curved outward, form a cross-sectionally approximately V-shaped receiving pocket for the conveyable articles. The closed position is secured by a detent pawl SK which can be rotated about an axis designated by A and can be released by actuating a solenoid HM. If the detent pawl SK is released, then the movable wall part BW is pivoted about the pivot pin DA such that an ejection alit, which is open at the bottom and belongs to the conveyable-article carrier FT, is formed. In this arrangement, the bottom extension of the movably arranged wall part BW forms an ejection chute AR which adjoins said ejection alit at the bottom and is inclined counter to the transporting direction TR.

Figure 3:
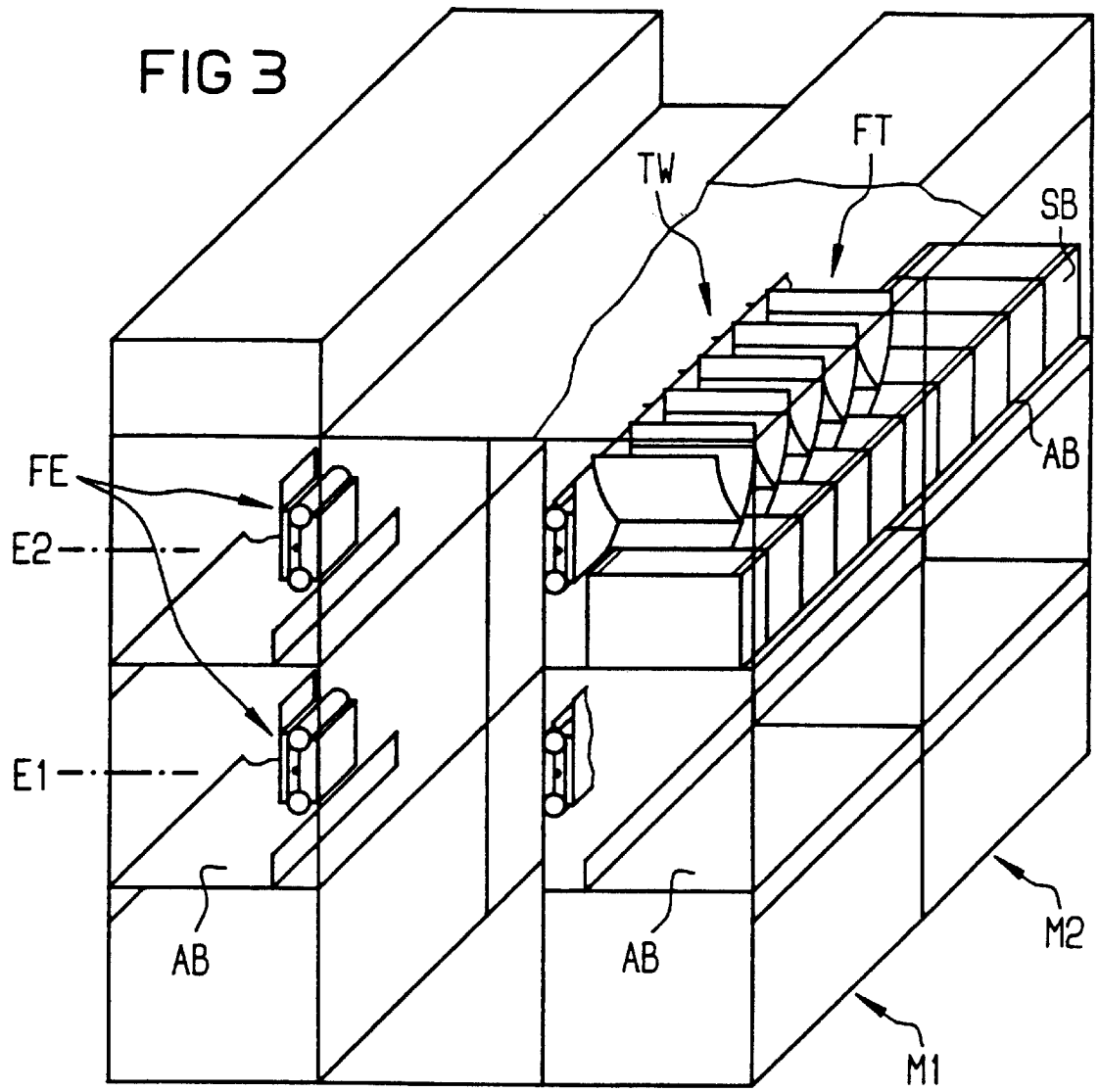
FIG. 3 is a perspective illustration of two modules, lined up side by side, of a sorting apparatus equipped with conveyable-article carriers according to FIG. 1 and with conveying device according to FIG. 2.

FIG. 3 shown a perspective illustration of two modules M1 and M2, lined up side by side, of a sorting apparatus equipped with conveyable-article carriers FT according to FIG. 1. In this arrangement, in each case a total of five conveyable-article carriers FT are fitted on one transporting carriage TW, the latter being a constituent part of a conveying device FE and circulating in two planes E1 and E2 upper and lower sections of the conveying device FE. Each module M1 and M2 has, in each plane E1 and E2, in each case two metal bearing plates AB, on which sorting containers SB can be lined up closely side by side. It can be seen that the conveyable-article carriers FT on the transporting carriages TW circulate above the sorting containers SB such that, upon actuation of the detent pawl SK (see FIG. 1), the conveyable articles (not illustrated specifically in FIG. 3) can be ejected into a sorting container SB assigned to the respective coding.

Figure 2:
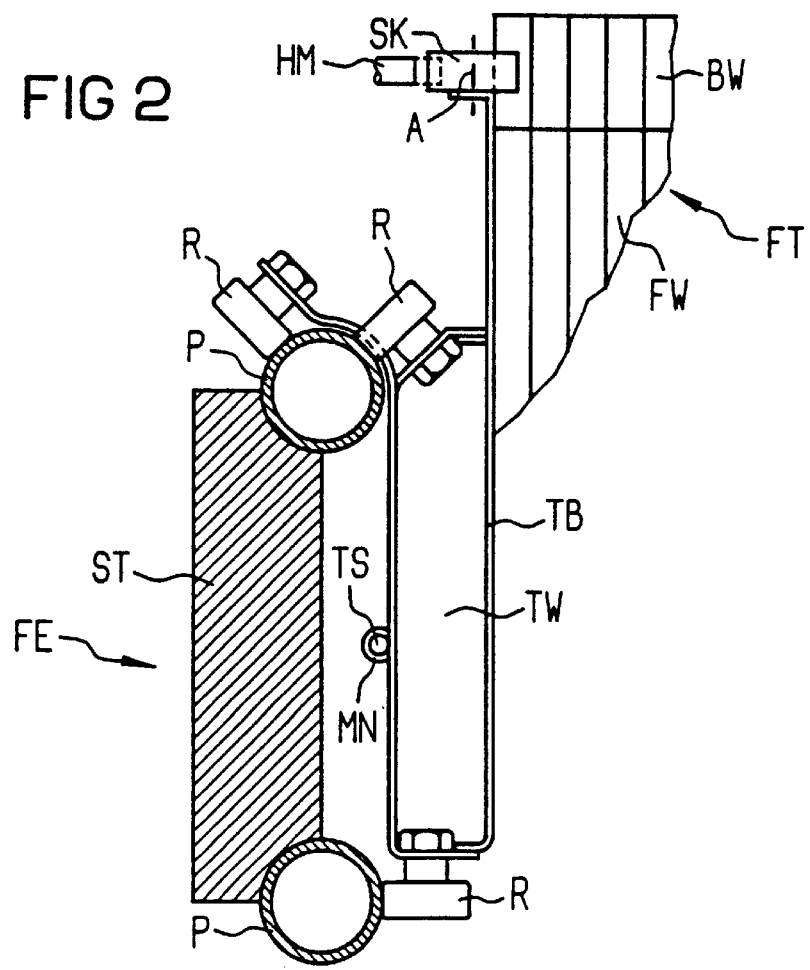
FIG. 2 is the operating principle of a conveying device on which conveyable-article carriers according to FIG. 1 circulate, said carriers being fastened on transporting carriages.

FIG. 2 shows closer details of the conveying device FE illustrated in FIG. 3. In the cross section illustrated here, it can be seen that the transporting carriage TW is guided, via rollers designated by R, on two tubular profiles or tubes P extending in the transporting direction TR (see FIG. 1). In this arrangement, the profiles P, aligned parallel to one another at a vertical distance, are connected to one another, in rectilinear regions of the conveying device FE, via webs ST likewise extending in the transporting direction TR, said webs ST being dispensed with in the curved regions. A transporting carriage TW is driven via an endlessly circulating transporting cable TS, on which the transporting carriage TW is fastened with the aid of a driver MN. On the side located opposite the transporting cable TS, the transporting carriage TW has a metal supporting plate TB on which the individual conveyable-article carriers FT are fastened by the end side and which also bears the detent pawls SK and the associated solenoids HM. The metal supporting plate TB functions in this arrangement as a securing means for the pivot pins DA of the movable wall parts BW, while the fixed wall parts FW of the individual conveyable-article carriers FT are connected fixedly to the metal supporting plate TB via end-side flanges F (see FIG. 1).

Figure 4:
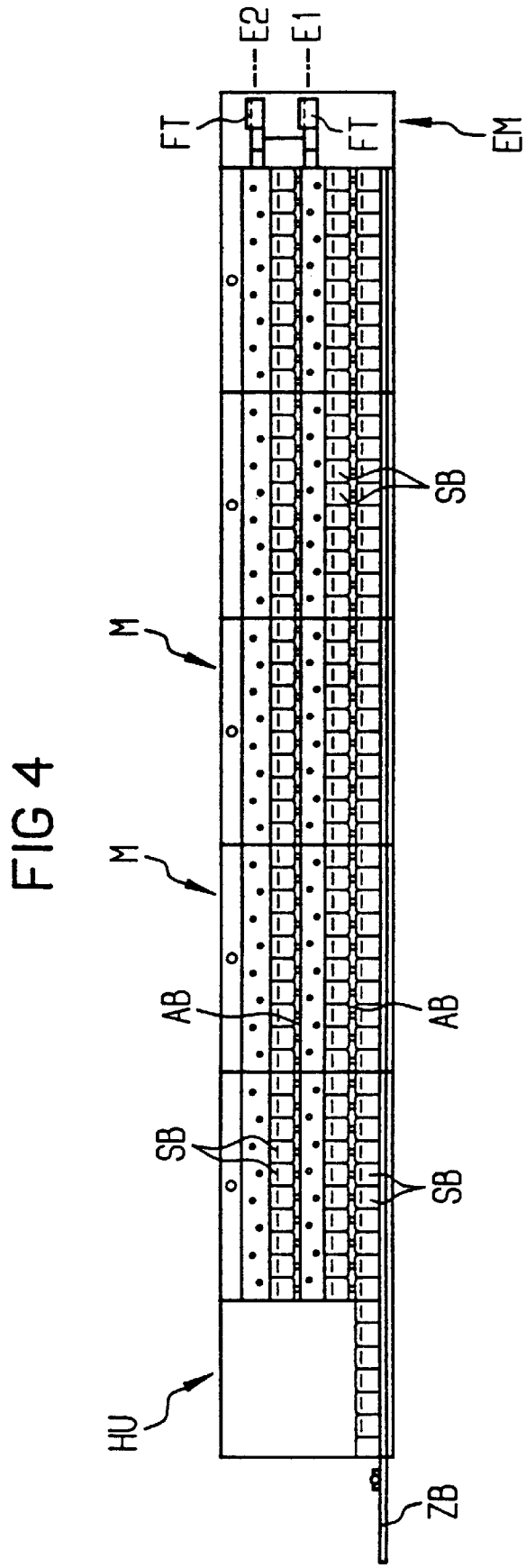
FIG. 4 is a side view of a sorting apparatus constructed from modules according to FIG. 3.
Figure 5:
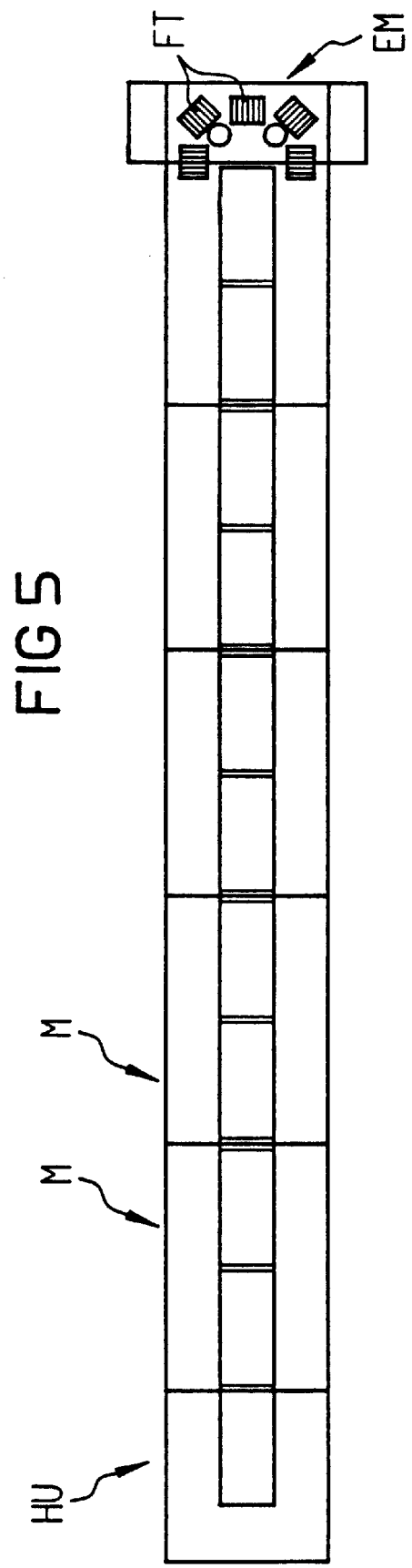
FIG. 5 is a plan view of the sorting apparatus according to FIG. 4.

FIGS. 4 and 5 show a side view and a plan view, respectively, of a sorting apparatus made up of individual modules M. In this arrangement, the individual modules N correspond to the modules M1 and M2 illustrated in FIG. 3, but, in FIG. 4, an additional feed belt ZB, which is arranged beneath the bottom plane E1 and is intended for providing empty sorting containers SB, is also illustrated. Upon removal of a full sorting container SB from the plane E1 or the plane E2, said sorting container can then be replaced by an empty sorting container SB provided on the feed belt ZB.

In the illustration according to FIGS. 4 and 5, a vertical deflection HU in located on the left-hand side in front of the first module M, while an end-side input module EM adjoins the last module M on the right-hand side. It can be seen that, in the region of said input module EM, the individual conveyable-article carriers FT can be loaded from the rear, from the end side or from the front, it being possible for loading to be carried out manually or mechanically.

Figure 6:
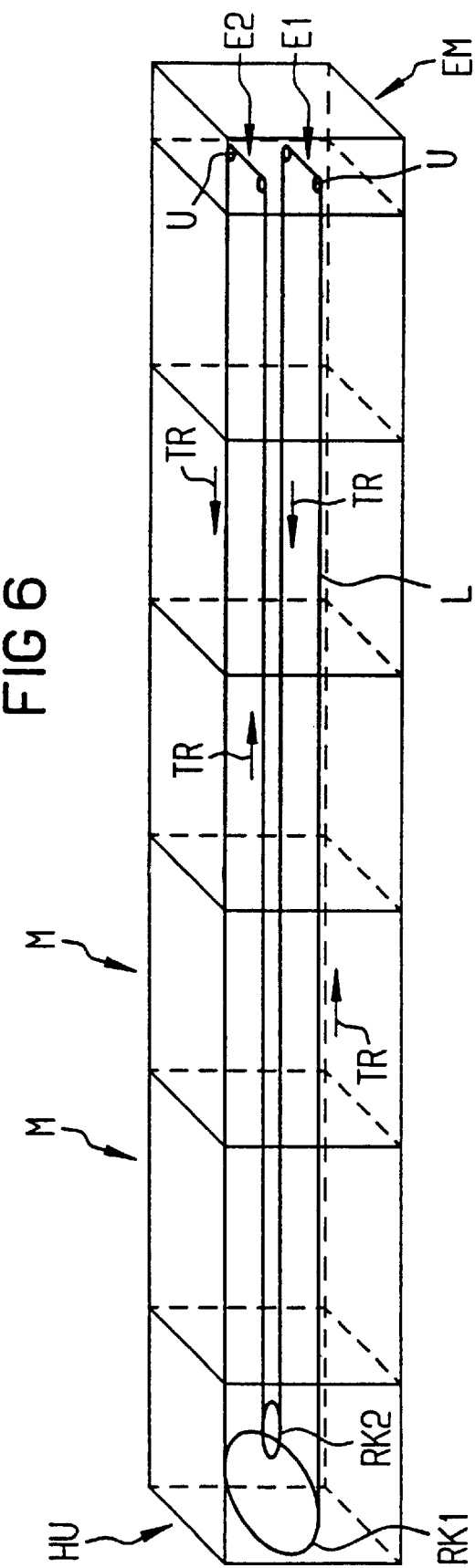
FIG. 6 is a perspective illustration of the guidance, over two planes, of the conveying device of the sorting apparatus illustrated in FIGS. 4 and 5.

FIG. 6 shows a vastly simplified schematic illustration of the guidance of the conveying device FE (see FIGS. 2 and 3) over the two planes E1 and E2. The line L shows the spatial routing of the transporting cable TS (see FIG. 4), the transporting direction being indicated by arrows TR. The guidance of the transporting cable TS in the region of the vertical deflection HU is indicated by two interengaging wheel rims RK1 and RK2. In order to simplify the illustration, the guidance of the transporting cable TS in the region of the input module EM is indicated by deflection rollers U. In the case of the actual embodiment, however, use in made here of a cable wheel in the plane E1 and of a wheel rim in the plane E2. In this cane, the cable wheel in the plane E1 serves simultaneously as a drive for the conveying device FE as a whole (see FIG. 2). The spatial routing of the profiles P (see FIG. 2) parallel to the line L cannot be seen in FIG. 6.

Figure 7:
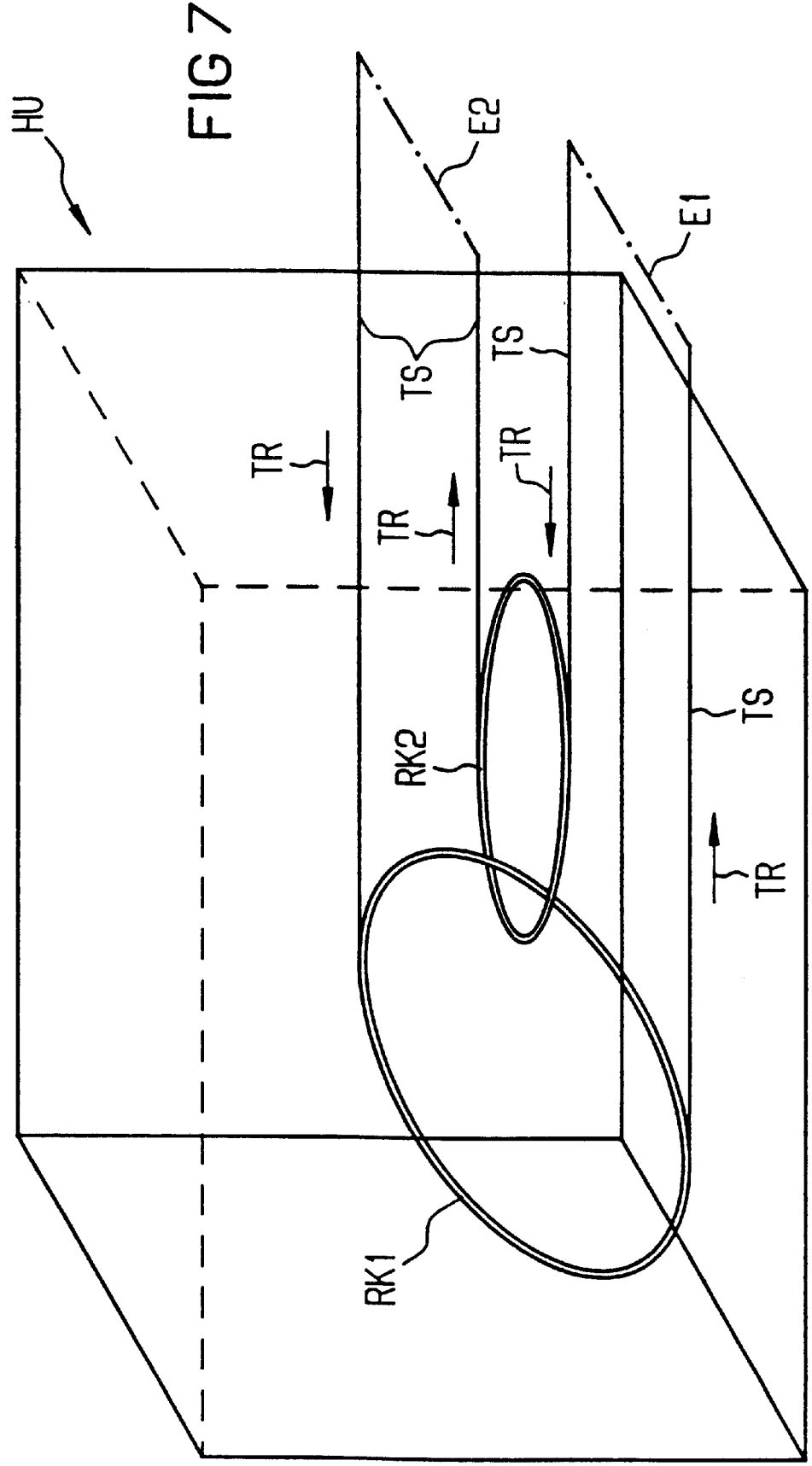
FIG. 7 is the vertical deflection of the conveying device illustrated in FIG. 6, with the schematically illustrated guidance of the transporting cable over two interengaging wheel rims.

FIG. 7 shows a vastly simplified schematic illustration of the vertical deflection HU according to FIG. 6 in detail. It can be seen that the transporting cable TS arrives in the transporting direction TR, from right to left, on the rear side of the top plane E2 or upper section, via the wheel rim RK1 obliquely forwards into the front side of the bottom plane E1 or lower section and, from there, continues in the transporting direction TR, from left to right. As it progresses, the transporting cable TS then arrives in the transporting direction TR, from right to left, on the rear side of the bottom plane E1 or lower section and is deflected, via the wheel rim RK2, obliquely forwards into the front side of the top plane E2 or the upper section and then continues in the transporting direction TR, from left to right. For purposes of clarity, the left ends of the upper and lower sections of the conveying device FE are referred to as the first ends and the right ends of the upper and lower sections of the conveying device (not shown in FIG. 7; see FIG. 6) are referred to as the second ends.

The routing of the profiles P (see FIG. 2) is not illustrated in FIG. 7. The profiles P, which are necessary for guiding the transporting carriages TW (see FIG. 2) over the second wheel rim RK2 likewise run through the interior of the first wheel rim RK1. The diameters of the two interengaging wheel rims RK1 and RK2 in this arrangement are selected such that the transporting carriages TW, along with the conveyable-article carriers FT fitted thereon (see FIG. 2), can run through the interior of the wheel rim RK1 without obstruction.

Figure 8:
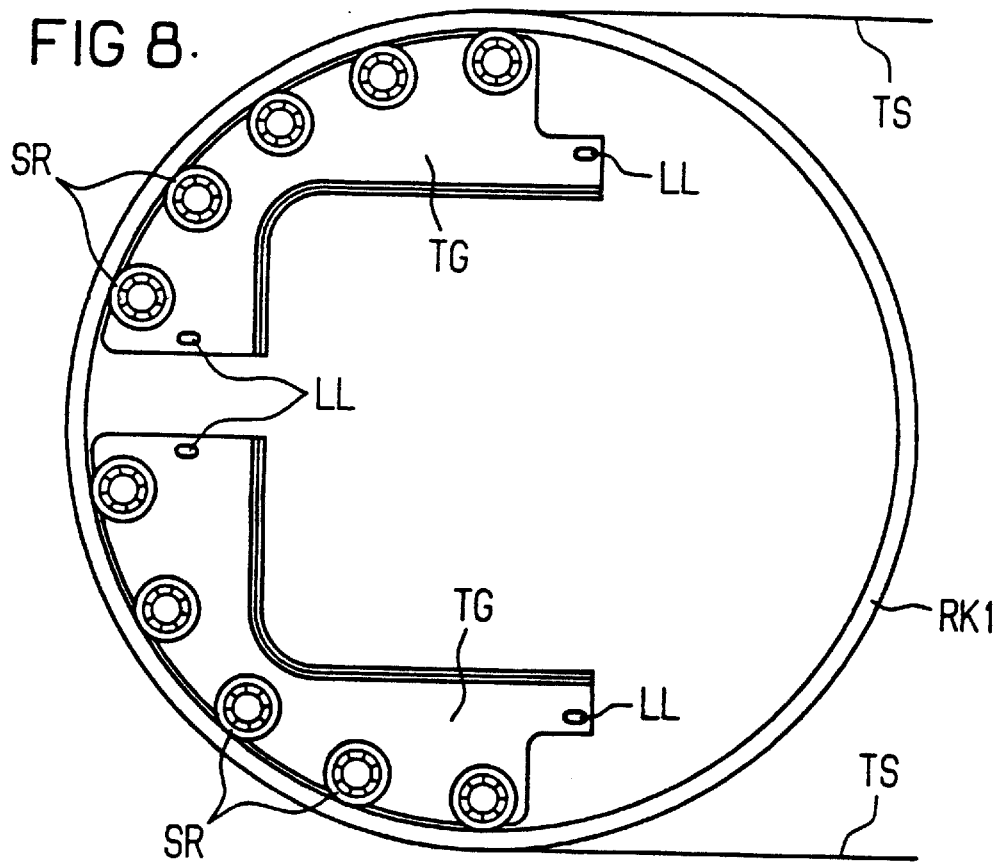
FIG. 8 is a plan view of a wheel rim which has its inner circumference mounted rotatably on a plurality of supporting rollers.

FIG. 8 shows a plan view of the wheel rim RK1, which has its inner circumference mounted rotatably on a total of ten supporting rollers SR. In this arrangement, in each case five supporting rollers SR, distributed over a quarter-circle, are arranged on carriers TG which, for their part, are fastened on the machine framework (not illustrated specifically) such that they can be adjusted via slots LL.

Figure 9:
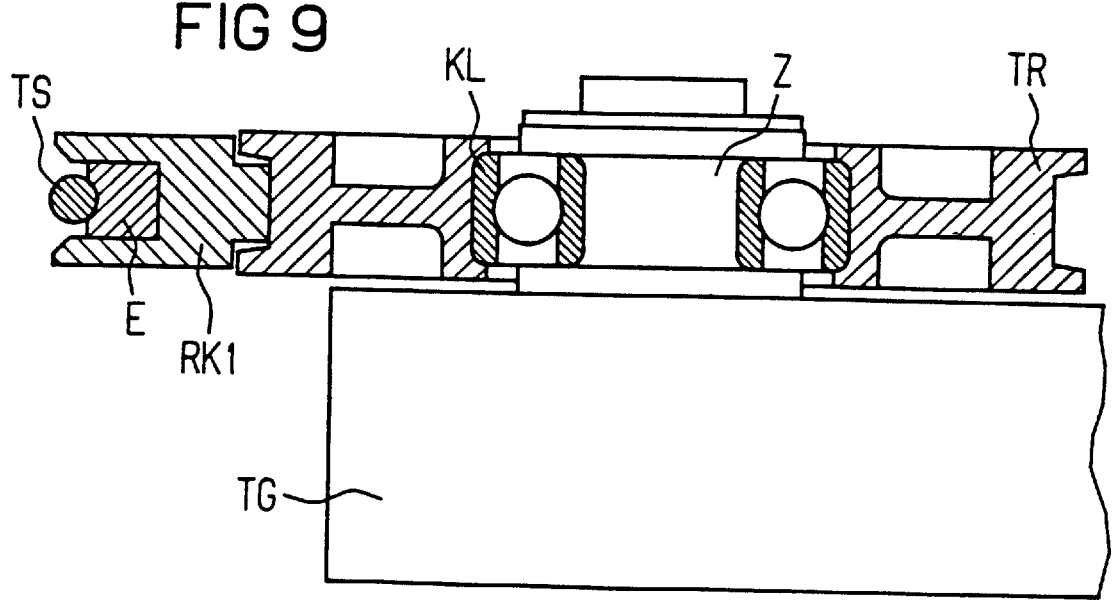
FIG. 9 is a radial section through the wheel rim and a supporting roller of the arrangement illustrated in FIG. 8.

FIG. 9 shows a radial section through the wheel rim RK1 and a carrier roller TR, which is arranged rotatably, via a ball bearing KL, on a spindle Z of the carrier TG.

The section illustrated in FIG. 9 also shows that the carrying cable TS in guided over an insert E of the wheel rim RK1. Quiet running is considerably improved as a result, in particular the drivers MN for the transporting carriages TW (see FIG. 2) being guided over the rubber insert E without rattling.

It can be seen from FIG. 8 that, in terms of the service life of the transporting cable TS which can be expected, guidance of the transporting cable TS over the wheel rim RK1 can be equated with guidance over a centrally mounted cable wheel. On the other hand, the arrangement which is illustrated in FIG. 8 has the advantage that the second wheel rim RR2 (see FIG. 7) as well as the profiles P and the transporting carriages TW with the conveyable-article carriers FT (see FIG. 2) can be guided through the first wheel rim RK1.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A sorting apparatus comprising:

a conveying device including an upper section and a lower section, the upper and lower sections being connected by a transport carriage, the transport carriage being connected to an endless cable, the transport carriage also being connected to a plurality of article carriers, the transport carriage and endless cable circulating the article carriers from the upper section to the lower section, the endless cable extending around a first wheel as the cable proceeds from the upper section to the lower section, the cable extending around a second wheel as the cable proceeds from the lower section to the upper section, each wheel having an inner circumference rotatably mounted onto a plurality of supporting rollers.

2. The sorting apparatus of claim 1 wherein the first wheel extends through the second wheel.

3. The sorting apparatus of claim 2 wherein at least one of the two wheels is separable so said one of the two wheels can be removed from the other of the two wheels.

4. The sorting apparatus of claim 1 wherein the wheels comprise non-metallic inserts for engaging the cable.

5. The sorting apparatus of claim 4 wherein the inserts consist of rubber.

6. The sorting apparatus of claim 1 wherein the upper and lower sections are disposed parallel to one another, each section comprising a front side disposed between a first and second opposing ends thereof and a rear side disposed between said first and second opposing ends, the front sides of the upper and lower sections being substantially coplanar, the rear sides of the upper and lower sections being substantially coplanar, the first wheel being disposed between the first ends of the upper and lower sections and extending from the rear side of the upper section to the front side of the lower section, the second wheel being disposed between the first ends of the upper and lower sections and extending from the rear side of the lower section to the front side of the upper section.

7. The sorting apparatus of claim 6 wherein the endless cable is propelled from the second end of the upper section along the rear side thereof to the first end of the upper section, around the first wheel to the first end of the lower section at the front side thereof, along the front side of the lower section to the second end thereof, around at least one deflection roller disposed at the second end of the lower section to the rear side of the lower section, along the rear side of the lower section from the second end to the first end thereof, around the second wheel to the front side of the upper section at the first end thereof, along the front side of the upper section to the second end thereof and around at least one deflection roller disposed at the second end of the upper section to the rear side of the upper section.

8. The sorting apparatus of claim 1 wherein the transport carriage comprises a plurality of rollers, the upper and lower sections of the conveying device each comprise a tubular member that engages the rollers of the transport carriage.

9. A sorting apparatus comprising:

a conveying device including an upper section and a lower section, the upper and lower sections being connected by a transport carriage, the transport carriage being connected to an endless cable, the endless cable being propelled by a transport roller, the transport carriage being connected to a plurality of article carriers, the transport carriage and endless cable circulating the article carriers from the upper section to the lower section, the upper and lower sections being disposed parallel to one another, each section comprising a front side disposed between a first and second opposing ends thereof and a rear side disposed between said first and second opposing ends, the front sides of the upper and lower sections being substantially coplanar, the rear sides of the upper and lower sections being substantially coplanar, the first ends of the upper and lower sections engaging a first wheel that extends from the rear side of the upper section to the front side of the lower section, the first ends of the upper and lower sections engaging a second wheel that extends from the rear side of the lower section to the front side of the upper section, the endless cable extending around the first wheel as the cable proceeds from the rear side of the upper section to the front side of the lower section, the cable extending around the second wheel as the cable proceeds from the rear side of the lower section to the front side of the upper section, each wheel having an inner circumference rotatably mounted onto a plurality of supporting rollers.

10. The sorting apparatus of claim 9 wherein the first wheel extends through the second wheel.

11. The sorting apparatus of claim 10 wherein at least one of the two wheels is separable so said one of the two wheels can be removed from the other of the two wheels.

12. The sorting apparatus of claim 9 wherein the wheels comprise non-metallic inserts for engaging the cable.

13. The sorting apparatus of claim 12 wherein the inserts consist of rubber.

14. The sorting apparatus of claim 9 wherein the endless cable is propelled from the second end of the upper section along the rear side thereof to the first end of the upper section, around the first wheel to the first end of the lower section at the front side thereof, along the front side of the lower section to the second end thereof, around at least one deflection roller disposed at the second end of the lower section to the rear side of the lower section, along the rear side of the lower section from the second end to the first end thereof, around the second wheel to the front side of the upper section at the first end thereof, along the front side of the upper section to the second end thereof and around at least one deflection roller disposed at the second end of the upper section to the rear side of the upper section.

15. The sorting apparatus of claim 9 wherein the transport carriage comprises a plurality of rollers, the upper and lower sections of the conveying device each comprise a tubular member that engages the rollers of the transport carriage.

16. A sorting apparatus comprising:

a conveying device including an upper section and a lower section, the upper and lower sections being connected by a transport carriage, the transport carriage being connected to an endless cable, the endless cable being propelled by a transport roller, the transport carriage being connected to a plurality of article carriers, the transport carriage and endless cable circulating the article carriers from the upper section to the lower section, the transport carriage comprises a plurality of rollers, the upper and lower sections of the conveying device each comprise a tubular member that engages the rollers of the transport carriage, the upper and lower sections being disposed parallel to one another, each section comprising a front side disposed between a first and second opposing ends thereof and a rear side disposed between said first and second opposing ends, the front sides of the upper and lower sections being substantially coplanar, the rear sides of the upper and lower sections being substantially coplanar, the first ends of the upper and lower sections engaging a first wheel that extends from the rear side of the upper section to the front side of the lower section, the first ends of the upper and lower sections engaging a second wheel that extends from the rear side of the lower section to the front side of the upper section, the endless cable extending around the first wheel as the cable proceeds from the rear side of the upper section to the front side of the lower section, the cable extending around the second wheel as the cable proceeds from the rear side of the lower section to the front side of the upper section, each wheel having an inner circumference rotatably mounted onto a plurality of supporting rollers, the first wheel extending through the second wheel, the wheels each comprising non-metallic inserts for engaging the cable.

17. The sorting apparatus of claim 16 wherein at least one of the two wheels is separable so said one of the two wheels can be removed from the other of the two wheels.

18. The sorting apparatus of claim 16 wherein the inserts consist of rubber.

19. The sorting apparatus of claim 16 wherein the endless cable is propelled from the second end of the upper section along the rear side thereof to the first end of the upper section, around the first wheel to the first end of the lower section at the front side thereof, along the front side of the lower section to the second end thereof, around at least one deflection roller disposed at the second end of the lower section to the rear side of the lower section, along the rear side of the lower section from the second end to the first end thereof, around the second wheel to the front side of the upper section at the first end thereof, along the front side of the upper section to the second end thereof and around at least one deflection roller disposed at the second end of the upper section to the rear side of the upper section.

* * * * *